United States Patent [19]

Balph et al.

[11] Patent Number: 5,631,962
[45] Date of Patent: May 20, 1997

[54] CIRCUIT AND METHOD OF ENCRYPTING KEY VALIDATION

[75] Inventors: Thomas J. Balph, Mesa; Steven D. Millman, Chandler, both of Ariz.

[73] Assignee: Motorola, Inc., Schaumburg, Ill.

[21] Appl. No.: 547,005

[22] Filed: Oct. 23, 1995

[51] Int. Cl.⁶ .................................................. H04L 9/00
[52] U.S. Cl. ......................... 380/25; 380/23; 380/49
[58] Field of Search .............................. 380/23, 24, 25, 380/4, 49, 46, 30, 28

[56] References Cited

U.S. PATENT DOCUMENTS

| | | | |
|---|---|---|---|
| 4,893,338 | 1/1990 | Pastor | 380/25 |
| 4,944,009 | 7/1990 | Micali et al. | 380/46 |
| 5,504,773 | 4/1996 | Padovani et al. | 380/34 |

*Primary Examiner*—David C. Cain
*Attorney, Agent, or Firm*—Robert D. Atkins

[57] ABSTRACT

An electronic key validation process increases security by encrypting the security access codes. A key (10) receives data having a hidden polynomial select code and polynomial seed from a host (12). A locally stored (24, 26) select offset and seed offset in the key identifies the location (22) of the select code and seed in the data. The select code decodes (32) into polynomial coefficients which are used to configure a polynomial generator (34). The seed is loaded into the polynomial generator as a starting point of the polynomial. The polynomial generator is clocked a number of cycles to calculate a remainder. The select code is modified (28) to select a new polynomial, and the polynomial generator is clocked another number of cycles. The host runs a similar encryption algorithm. The remainder is sent to the host where it is compared with the host generated remainder for key validation.

20 Claims, 3 Drawing Sheets

CIRCUIT AND METHOD OF ENCRYPTING KEY VALIDATION

BACKGROUND OF THE INVENTION

The present invention relates in general to electronic key validation and, more particularly, to encrypting data for key validation.

Vehicle security is a major concern especially in high-crime metropolitan areas. In the past, vehicle security has often been limited to mechanical keys with serrated edges that must match a lock tumbler pattern in order to unlock the door and engage the ignition to start the engine. Mechanical keys are relatively easy for professional thieves to overcome. Special tools can rotate the tumblers of the door lock, or the thief can simply break a window to gain entry. Once inside the vehicle, it is relatively easy to remove the ignition switch and electrically bypass it. Conventional keys offer relatively limited protection against the professional thief.

Mechanical locks provide a first level of security for entry and operation of the automobile. The automobile control system allows starting of the engine. As a second level of security, the key is also be electronically validated within a short time for the auto to continue operating. The automobile control system sends a predefined security request to the key by inductive coupling to validate the identification and authorization of the key. If the key does not provide the correct security response code, the automobile control system shuts down the engine, locks out all functions, and possibly sounds an anti-theft alarm.

More recent developments provide for remote keyless entry (RKE) where the owner can press a button on the key or other device some distance from the auto to lock or unlock the doors, unlatch the trunk, turn on head lights, set off a panic alarm, or any one of a number of other functions. The key or device broadcasts a security code and command by infrared or radio frequency (RF) transmission. The vehicle responds to the command only if the security code matches its internally stored code. The security codes can be set at the factory or transmitted as rolling encrypted codes, i.e. one that changes each transmission.

The RKE security system is not fool-proof. One weakness of the RKE security systems that do not use rolling encryption codes is that a sophisticated thief can monitor the broadcast and record the security ID and access codes. Alternatively, if the key is left with a repair facility, an unscrupulous person can relatively easily copy the fixed security codes by sending a security request and monitoring the response. The dishonest person need only re-transmit the same security code to gain access at an opportune time. Prior art implementations of rolling encryption codes tend to be quite complex.

Hence, a need exists for a simple yet effective security protection scheme.

DETAILED DESCRIPTION OF THE PREFERRED EMBODIMENT

Figure 1:
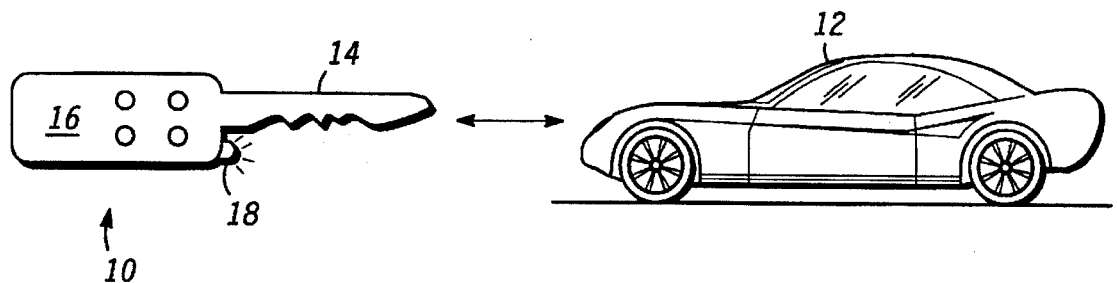
FIG. 1 is a block diagram illustrating key-to-host communication.

Referring to FIG. 1, a remote keyless entry system with electronically encrypted key validation is shown with key 10 sending and receiving security IDs and commands to and from host 12, which is shown as an automobile. There could be several authorized keys that can operate the automobile, for example, one for each member of a family. The present invention is applicable to other hosts including trucks, heavy equipment, boats, aircraft, houses, offices, safes, briefcases, or anything else that justifies secured access.

Key 10 has a serrated metal portion 14 and a plastic body 16 housing an electronic integrated circuit. Plastic body 16 includes buttons for selecting a variety of command functions. The buttons could be located on a device separate from the key. A first button unlocks the doors, a second button unlatches the trunk, a third turns on lights, and a fourth button sets off a panic alarm. Additional buttons can provide more command options. Also, the buttons can have more than one function with a "shift" or "2nd" option. The command functions are transmitted to host 12 in frames of information by radio frequency (RF) link using serrated metal portion 14 as an antenna. Another option is to transmit command functions by infrared light emitting diode 18.

Key 10 can also communicate directly with host 12, for example, when metal portion 14 is placed in the door lock or ignition switch. Serrated portion 14 turns the mechanical tumblers as a first level of security, and forms an inductive coupling or metal-to-metal contact to allow direct electrical communication. The mechanical match between serrated portion 14 and the ignition tumblers enables the switch to start the engine. The control system for the automobile then initiates an electronic validation process for key 10 by sending and receiving frames of information by way of the direct electrical communication.

Figure 2:
FIG. 2 illustrates a frame format for remote key-host communication.

A frame has a predetermined number of bits organized into fixed-length fields. The frame size and format is typically different for remote communication (e.g. RF link) and direct communication (e.g. inductive coupling or metal-to-metal contact). For the present embodiment, the remote communication frame has six fields as shown in FIG. 2. The PREAMBLE field has 24 bits used to train the host receiver. The receiver in host 12 is typically asleep to conserve power waiting to receive an RF signal from key 10 of sufficient signal strength to wake it up. The host receiver then trains to the incoming data rate by phase locking to an embedded clock signal in the 24-bit PREAMBLE data stream. The PREAMBLE field can be longer or shorter depending on the requirements of the host receiver to lock up to the incoming signal. Once the host receiver has achieved phase lock, it is ready to receive actual data. The 8-bit START DELIMITER field contains a unique value that separates phase locking data from the start of real data in the frame. The 16-bit ID CODE represents the key's ID. With sixteen bits (65536 combinations), it is unlikely that any two users with the same ID CODE will come into contact with each other's vehicle. The ID CODE can be expanded to 32 bits or more for even greater uniqueness. The 3-bit COMMAND CODE field identifies the type of command as shown in Table 1. The 32-bit DATA field contains the data. The 6-bit COUNT field contains a count of the number of runs through the encryption process. The polynomial remainder, which functions as the validation code, changes with each run of the polynomial generator which occurs each time a command button on the key is pressed. Hence, the count field indicates the number of attempts at transmission, i.e. the number of times a command button on the key was pressed, see further discussion below.

TABLE 1

| Remote Command Codes | |
|---|---|
| 000 | Unlock trunk |
| 001 | Unlock passenger door |
| 010 | Unlock all doors |
| 011 | Lock all doors |
| 100 | Turn on lights |
| 101 | Panic alarm |

Figure 3:
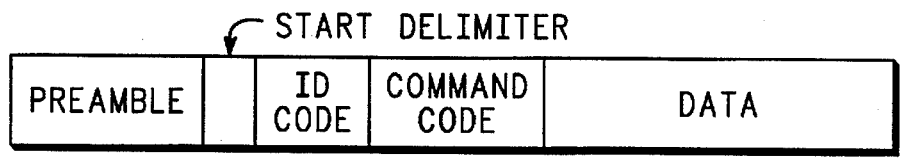
FIG. 3 illustrates a frame format for direct key-host communication.

The direct communication frame has five fields as shown in FIG. 3. The PREAMBLE field, START DELIMITER field, ID CODE field, and DATA field are used as described above. The 4-bit COMMAND CODE field identifies the type of command as shown in Table 2.

TABLE 2

| Direct Command Codes | |
|---|---|
| 0001 | ID REQUEST: host sends request for key ID |
| 0010 | ID RESPONSE: key sends ID number and status of program bit to host |
| 0011 | PASSWORD REQUEST: host sends 32-bit encoded password request |
| 0100 | PASSWORD RESPONSE: key responds with 32-bit encoded password |
| 0101 | STATUS REQUEST: host requests key to send status |
| 0110 | STATUS RESPONSE: key responds with status information |
| 0111 | PROGRAM REQUEST: host sends request for key to do key programming sequence |
| 1000 | PROGRAM RESPONSE: unprogrammed key sends response three times in succession with offsets and blows program bit |
| 1001 | SET RF PASSWORD REQUEST: host sends seed and polynomial select code used for RKE |
| 1010 | SET RF PASSWORD RESPONSE: key confirms loading of seed and polynomial select code |

As a feature of the present invention, the key validation process begins with an initial identification sequence followed by host 12 randomly generating and sending a 3-bit polynomial select code and a 16-bit polynomial seed to key 10. Host 12 can randomly generate the polynomial select code and polynomial seed, for example, by sampling an internal clock that records time of day and performing any one of a number of well known calculations to generate a random number within the defined range. The defined range for the polynomial select codes is "000" through "111", and the defined range for the polynomial seeds is "0000000000000001" through "1111111111111111". The polynomial select code selects a particular polynomial for a polynomial generator, while the polynomial seed is the initial value for the polynomial generator. After running a number of cycles, the programmable polynomial generator 34 provides a resultant remainder.

Both key 10 and host 12 are running the same polynomial generator based on the same polynomial select code and polynomial seed and, therefore, should calculate the same remainder value. Key 10 returns the resultant remainder to host 12 as a key validation code for comparison with the remainder calculated by host 12. If the resultant remainders calculated by key 10 and host 12 match, then key 10 is validated and the automobile remains fully operational. If the resultant remainders calculated by key 10 and host 12 do not match, then key 10 is not validated and the automobile control system shuts down the engine, locks out all functions, and possibly sounds an anti-theft alarm. Alternately, a complete key validation process could be required before the engine is allowed to start.

With this key validation process, an unauthorized user cannot monitor the transmitted remainder and attempt to send the same remainder because, for the next access, host 12 randomly generates a different polynomial select code and polynomial seed count which translate into a different remainder. Thus, the polynomial encryption method of the present invention stays one step ahead of the would be thief.

Consider a more detailed example where key 10 is inserted into the ignition switch, turns the mechanical tumblers, and the engine starts. The automobile control system begins an electronic key validation process. Host 12 first makes an ID REQUEST type of COMMAND CODE, i.e. "who are you?", according to the frame format described in FIG. 3. Key 10 responds with an ID RESPONSE, e.g. "I am user 001", according to the frame format described in FIG. 3. The ID REQUEST and ID RESPONSE are typically not encrypted. Host 12 is simply trying to determine which one of the authorized users is attempting access to the auto since the auto can recognize multiple keys. Next, host 12 makes a 32-bit PASSWORD REQUEST data command, in other words, "run polynomial based on enclosed select code and seed and generate remainder". The polynomial select code and polynomial seed are randomly generated and enclosed, but hidden, in the PASSWORD REQUEST data command sent by host 12. Key 10 and host 12 both go about running their respective polynomial generators based on the given polynomial select code and polynomial seed to calculate the remainder.

Figure 4:
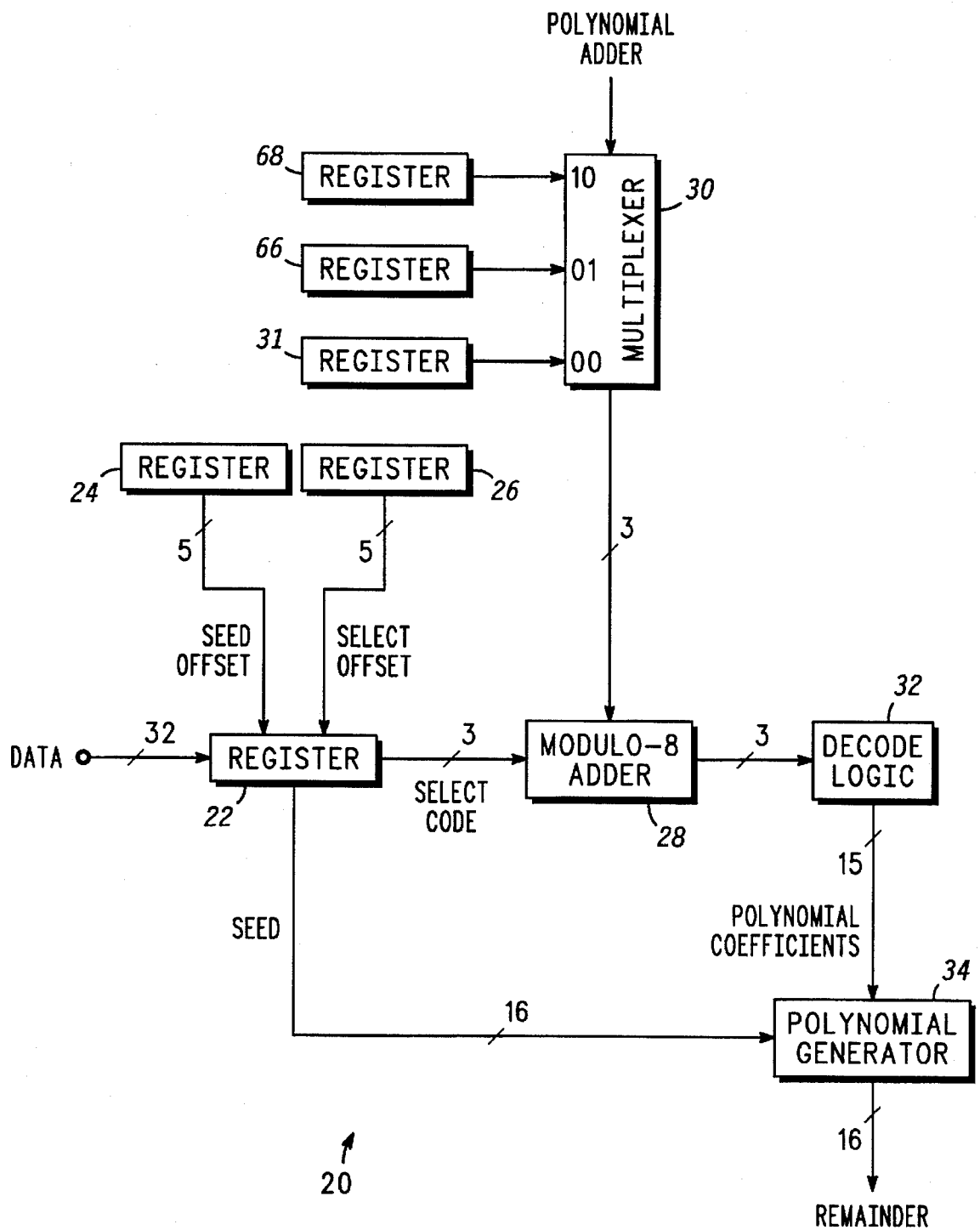
FIG. 4 is a block diagram illustrating an encryption system for key validation.

Turning to FIG. 4, a block diagram of encryption circuit 20 in key 10 is shown for calculating the remainder. Encryption circuit 20 is suitable for manufacturing as an integrated circuit using conventional integrated circuit processes. Host 12 uses an identical encryption process for calculating its remainder for comparison to the key remainder. The PASSWORD REQUEST frame has a 32-bit DATA field, including the 3-bit polynomial select code and 16-bit polynomial seed, which is stored in register 22. The 3-bit polynomial select code selects one of a number of possible polynomials. The 16-bit polynomial seed can be any 16-bit number, other than all zeroes, and determines the starting point for the selected polynomial. The all zeroes case is handled with additional circuitry. The polynomial select code and polynomial seed are hidden in positions of the 32-bit DATA field known only to key 10 and host 12. Key 10 includes a register 24 for storing a 5-bit seed offset and register 26 for storing a 5-bit select offset. Host 12 has identical registers 24 and 26 with the same seed offset and select offset values. The seed offset and select offset define the starting location of the polynomial select code and polynomial seed in register 22, respectively. For example, if register 24 has a value of five for the seed offset and register 26 has a value twenty-five for the select offset, then bits 5–20 of register 22 contain the 16-bit polynomial seed, e.g. "0000000000000001" and bits 25–27 contain the 3-bit polynomial select code, e.g. "000". The remaining bits of register 22 are random data.

In an alternate embodiment, the seed offset and select offset overlap in register 22, for example, both point to starting bit position 25. In that case, the polynomial select code is read from bits 25–27, while the polynomial seed is read from bits 25–31 and then wraps around to bits 0–8.

Thus, the first level of protection involves hiding the polynomial select code and polynomial seed somewhere in the 32-bit PASSWORD REQUEST data command field sent to key 10. Only by knowing the seed offset internally stored in register 24 and the select offset internally stored in register 26 can the locations of the polynomial select code and polynomial seed in the 32-bit DATA field be determined.

Although the present embodiment discloses the seed and select code offsets pre-loaded into hard-wired registers 24 and 26, another option is to have these values programmable and remotely loaded for example into an EEPROM.

The polynomial select code "000", as identified by the select offset, is loaded into modulo-8 adder 28 which operates to modify the polynomial select code. Modulo-8 adder 28 does not use the carry-out of the most significant bit. A POLYNOMIAL ADDER control signal controls multiplexer 30 that provides new values to adder 28 as discussed below. For this initial sequence, POLYNOMIAL ADDER is "00" to select register 31 which is pre-loaded with a value zero to add with the initial polynomial select code. With three bits, the select code has eight possible values to select one of eight different polynomials. Decode logic 32 receives the select code from adder 28 and provides one of the eight possible polynomials according Table 3, which is shown in binary format from bit 0 in the least significant bit (far right) to bit 14 in the most significant bit (far left). The polynomials are maximal length, that is, no pattern repeats again during the full cycle. For a sixteen bit polynomial the full cycle consists of $2^{16}$, or 65536, possible combinations less one since all zeroes is not used in the present example. The maximal length polynomial produces a particular pattern only once every 65535 clock cycles. Maximal length polynomials are well known and defined in conventional math tables. The decode logic necessary to translate the select code into eight different polynomials is well known in the art. For example, the select code could address memory locations where the polynomial coefficients are stored. Alternately, a predetermined value, e.g. "000000001111111", is placed in a register with fifteen outputs (not shown). The outputs of the register are routed through combinational logic including multiplexers operating under control of the select code bits to mix up the bits in eight different ways to realize eight different 15-bit polynomial coefficients.

TABLE 3

| Polynomial Coefficients | |
| --- | --- |
| 000 | "110110110000001" |
| 001 | "111011000010111" |
| 010 | "110110000010011" |
| 011 | "110000101101111" |
| 100 | "101100101101101" |
| 101 | "101110111100111" |
| 110 | "100100110001011" |
| 111 | "101110001110011" |

A select code of "000" translates into polynomial coefficients of "110110110000001" by decode logic 32. The polynomial for select code "000" is $1*x^{16}+1*x^{15}+1*x^{14}+0*x^{13}1*x^{12}+1*x^{11}+0*x^{10}+1*x^9+1*x^8+0*x^7+0*x^6+0*x^5+0*x^4+0*x^3+0*x^2+1*x^1$. Likewise, the polynomial for select code "001" is $1*x^{16}+1*x^{15}+1*x^{14}+1*x^{13}+0*x^{12}+1*x^{11}+1*x^{10}+0*x^9+0*x^8+0*x^7+0*x^6+1*x^5+0*x^4+1*x^3+1*x^2+1*x^1$. Other polynomials are defined in a similar manner in Table 3. The coefficient of the most significant bit of the polynomial coefficient ($x^{16}$) is always one and is therefore omitted from Table 3.

The 15-bit polynomial coefficients from decode logic 32, e.g. "110110110000001" with a select code of "000", is used to configure polynomial generator 34. The polynomial seed "0000000000000001", as identified by the seed offset, is routed from register 22, masked as described below, and loaded into polynomial generator 34. Polynomial generator 34 provides the 16-bit remainder following the calculations.

Figure 6:
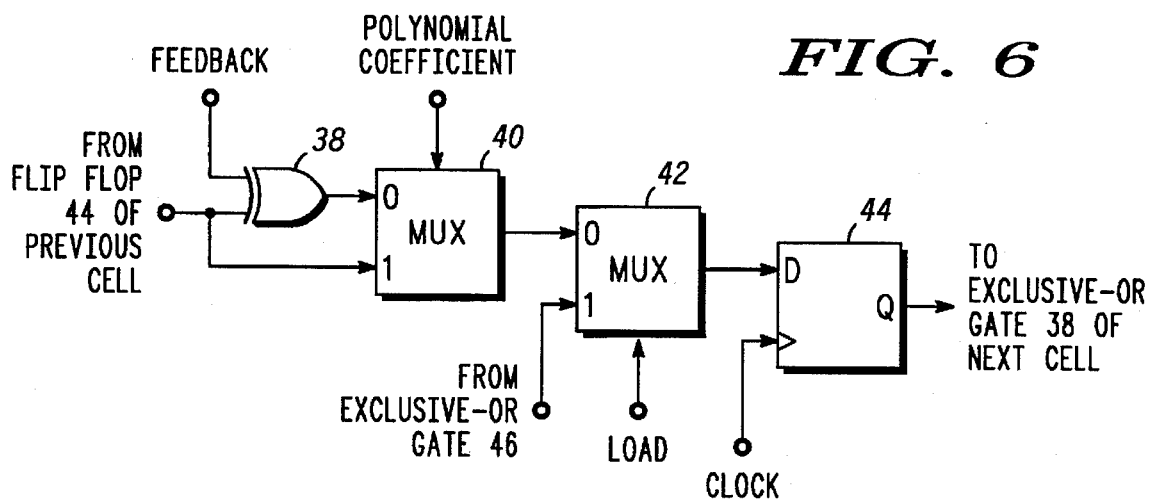
FIG. 6 is a block diagram illustrating further detail of one cell of the polynomial generator.
Figure 5:
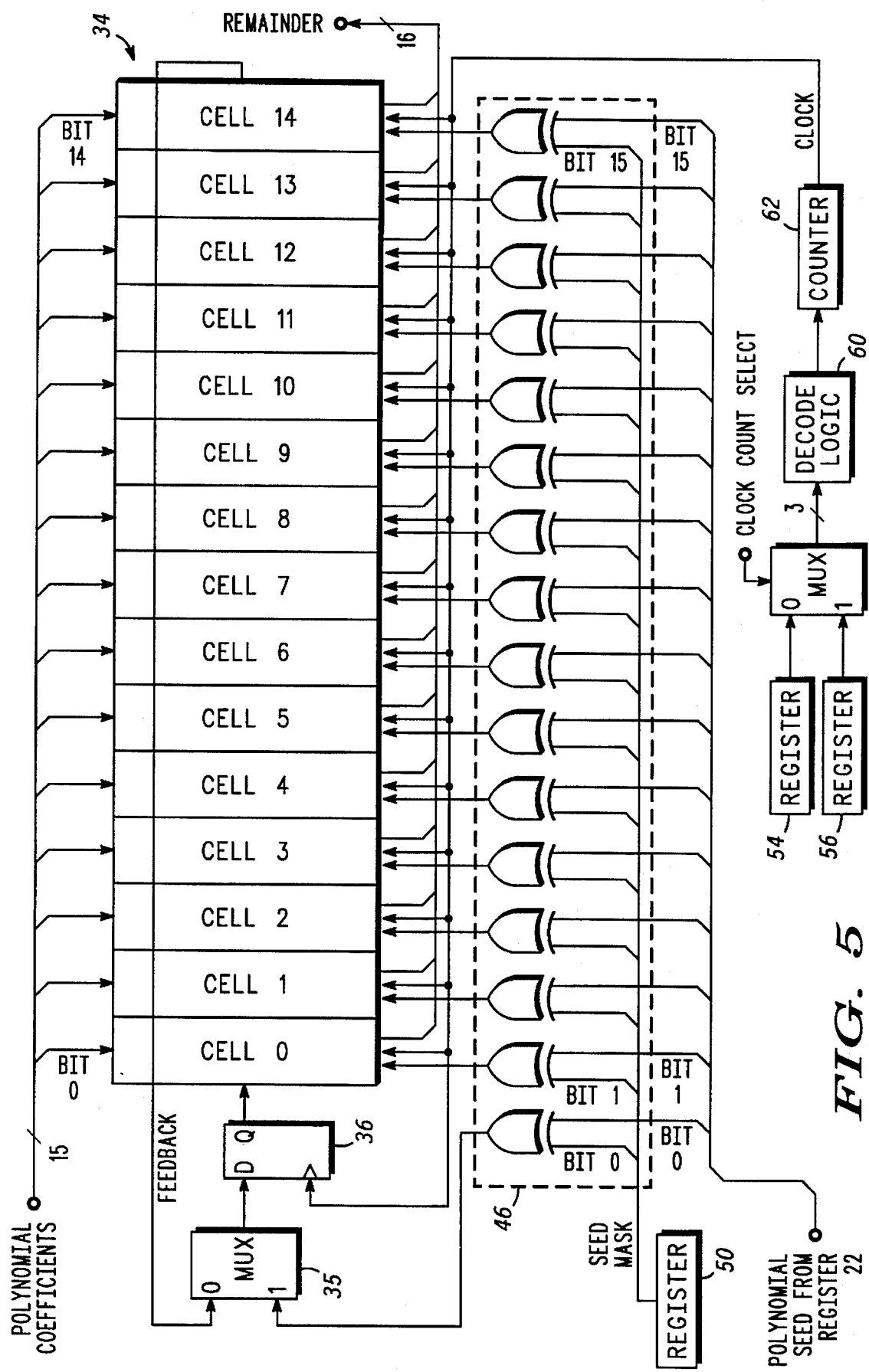
FIG. 5 is a block diagram illustrating the polynomial generator of FIG. 4.

Further detail of polynomial generator 34 is shown in FIG. 5. Polynomial generator 34 has fifteen cells 0–14 and an additional flip-flop 36. Each cell has an exclusive-OR gate 38, multiplexers 40 and 42, and flip-flop 44 as shown in FIG. 6. The Q-output of flip-flop 36 is coupled to one input of exclusive-OR gate 38 and to one input of multiplexer 40 in cell 0. The Q-output of flip-flop 44 in cell 0 is coupled to one input of exclusive-OR gate 38 and one input of multiplexer 40 in cell 1. The Q-output of flip-flop 44 in cell 1 is coupled to one input of exclusive-OR gate 38 and one input of multiplexer 40 in cell 2, and so on. The Q-output of flip-flop 44 in cell 14 labeled as FEEDBACK goes to a second input of each exclusive-OR gate 38 in cells 0–14 and to one input of multiplexer 35. The output of multiplexer 35 is coupled to the D-input of flip-flop 36. A clock signal CLOCK operating at 1.0 MHz is applied to the clock inputs of flip-flop 36 and flip-flops 44 in cells 0–14.

The 16-bit polynomial seed from register 22 is applied to one input of each of sixteen exclusive-OR gates 46. The second inputs of the exclusive-OR gates 46 receive a seed mask, e.g. "0100100110001010", from register 50 in key 10 and likewise in host 12. The exclusive-OR operation on the polynomial seed with the seed mask helps prevent deciphering of the polynomial seed. The outputs of the exclusive-OR gates 46, i.e. "0100100110001011", are loaded into flip-flops 44 of cells 0–14, and flip-flop 36, by way of multiplexers 35 and 42 on the rising edge of CLOCK when LOAD is logic one. Bit 0 (logic one) is loaded into flip-flop 36, bit 1 (logic one) is loaded into flip-flop 44 of cell 0, bit 2 (logic zero) is loaded into flip-flop 44 of cell 1, and so on until bit 15 (logic zero) is loaded into flip-flop 44 of cell 14. In an alternate embodiment (not shown), the polynomial seed could operate set/reset inputs of flip-flop 36 and flip-flops 44 to initialize their values.

Polynomial generator 34 further includes registers 54 that stores a first clock count code and register 56 that stores a second clock count code. Registers 54 and 56 each contain a 3-bit value that translates into a number of clock counts. With three bits, the clock count code has eight possible values. When the CLOCK COUNT SELECT control signal is logic zero, multiplexer 58 selects the first clock count code from register 54. When CLOCK COUNT SELECT is logic one, multiplexer 58 selects the second clock count code from register 56. Decode logic 60 receives the clock count code from multiplexer 58 and provides one of the eight possible clock counts according to Table 4. The decode logic necessary to translate the clock count code into eight different clock counts is well known in the art. For example, the clock count code could address memory locations where the clock counts are stored.

TABLE 4

| Clocks | |
| --- | --- |
| 000 | 256 |
| 001 | 288 |
| 010 | 320 |
| 011 | 352 |
| 100 | 384 |

TABLE 4-continued

| Clocks | |
|---|---|
| 101 | 416 |
| 110 | 448 |
| 111 | 480 |

Assume CLOCK COUNT SELECT begins as logic zero to select the first clock count in register 54, e.g. "001", which translates into 288 clock cycles in decode logic 60. Counter 62 is loaded with value 288 and issues an equal number of CLOCK cycles to flip-flop 36 and flip-flops 44 in cells 0–14. Thus, the polynomial generator is clocked 288 CLOCK cycles from the starting point defined by the polynomial seed to calculate a first remainder in the polynomial generator. A sophisticated thief may attempt to break the encryption algorithm by monitoring how long the polynomial generator runs and estimating the number of CLOCK cycles by knowing the clock frequency to counter 62. One technique to increase the difficulty in detecting the algorithm is to have counter 62 count up to 512 each time, but only enable CLOCK for the number of cycles defined in Table 4. For such an option, counter 62 is set to count up to 512. The output of counter 62 is compared to the clock count. When counter 62 reaches the clock count the CLOCK signal is disabled for the remainder of the 512 count.

Running polynomial generator 34 proceeds as follows. Assume polynomial seed "0100100110001011" is loaded into flip-flop 36 and flip-flops 44 of cells 0–14. Multiplexers 35 and 42 read from exclusive-OR gates 46 with a logic one LOAD signal. The LOAD control signal then goes to logic zero so that multiplexers 42 subsequently read from multiplexers 40 in each cell. Multiplexer 35 now reads the FEEDBACK signal. The first polynomial coefficients are "110110110000001" with the initial select code of "000" At the first CLOCK edge of the first clock count, the logic zero that was in flip-flop 44 of cell 14 is loaded as the FEED-BACK signal into flip-flop 36 through multiplexer 35. Bit 0 of the polynomial coefficient selects whether multiplexer 40 reads from the output of exclusive-OR gate 38 of cell 0 or from the Q-output of flip-flop 36. In the present example, bit 0 of the polynomial coefficient is logic one so multiplexer 40 in cell 0 reads from the Q-output of flip-flop 36. In cell 1, multiplexer 40 reads from the output of exclusive-OR gate 38 of cell 1 because bit 1 of the polynomial coefficient is logic zero. In cell 2, multiplexer 40 reads from exclusive-OR gate 38 in cell 2 because bit 2 of the polynomial coefficient is logic zero. Following the first CLOCK edge of the first clock count, flip-flop 36 and flip-flops 44 of cells 0–14 has been shifted once and contain "0110100011001001" with flip-flop 36 providing the most significant (far left) bit and cell 14 providing the least significant (far right) bit. On the second CLOCK edge, multiplexer 40 of cell 0 reads from flip-flop 36 because bit 0 of the polynomial coefficient is still logic one. In cell 1, multiplexer 40 reads from exclusive-OR gate 38 of cell 1 because bit 1 of the polynomial coefficient is logic zero, and so on. Following the second CLOCK edge of the first clock count, flip-flop 36 and flip-flops 44 of cells 0–14 have been shifted twice and contain "1000101101000000" with flip-flop 36 having the most significant bit and cell 14 having the least significant bit. Polynomial generator 34 receives another 286 CLOCK edges as counter 62 executes the first clock count. At the end of 288 CLOCK edges, assume that flip-flop 36 and flip-flops 44 in cells 0–14 contain the remainder value "1101000110010010" with flip-flop 36 having the most significant bit and cell 14 having the least significant bit.

The next step in the encryption algorithm involves modifying the polynomial select code to choose a different polynomial. The polynomial seed for the second run is the remainder from the conclusion of the first polynomial generator run cycle. POLYNOMIAL ADDER is set to "01" to read a first polynomial select code adder from 3-bit register 66. Assume the value in register 66 is "110" The new select code in adder 28 is "000"+"110"="110". From Table 3, the new polynomial coefficients are "100100110001011" with select code "110" which are applied to the control inputs of multiplexers 40 of cells 0–14, respectively. CLOCK COUNT SELECT is set to logic one so that multiplexer 58 reads the second clock count from register 56, e.g. "100". Decode logic 60 translates the second clock count "100" into a count value of 384 according to Table 4 which is loaded into counter 62.

LOAD remains at logic zero so that multiplexer 35 reads FEEDBACK and multiplexers 42 read from multiplexers 40 in each cell. At the first CLOCK edge of the second clock count, the logic zero that was in flip-flop 44 of cell 14 is loaded as the FEEDBACK signal into flip-flop 36. With the new polynomial coefficients, bit 0 is again logic one so multiplexer 40 in cell 0 reads from the Q-output of flip-flop 36. In cell 1, multiplexer 40 reads from the Q-output of flip-flop 44 of cell 0 because bit 1 of the polynomial coefficient is logic one, and so on. Following the first CLOCK edge of the second clock count, flip-flop 36 and flip-flops 44 of cells 0–14 contain "0110100011001001" with flip-flop 36 having the most significant bit and cell 14 having the least significant bit. Polynomial generator 34 receives another 383 CLOCK edges as counter 62 executes the second clock count. At the end of 384 CLOCK edges, assume that flip-flop 36 and flip-flops 44 in cells 0–14 contain the second remainder value "1010100101000010". Again, counter 62 waits for a full 512 counts before proceeding to the next step to make the encryption algorithm more difficult to decipher.

The polynomial select code is again modified to choose a third polynomial. The polynomial seed for third run is the remainder from the conclusion of the second polynomial generator run cycle. POLYNOMIAL ADDER is set to "10" to read a second polynomial select code adder from 3-bit register 68. Assume the value in register 62 is "100" The new select code in adder 28 is "110"+"100"="010" because the most significant carry-out drops off in the modulo arithmetic. From Table 3, the new polynomial coefficients are "110110000010011" with select code "010" which are applied to the control inputs of multiplexers 40 of cells 0–14. For the third running of polynomial generator 34, CLOCK COUNT SELECT can be set back to logic zero so that multiplexer 58 re-reads the first clock count from register 54, or the second clock count from register 56. Alternately, the first and second clock counts could be added together (not shown) for the third clock count, i.e. "001"+"100"="101". Decode logic 60 translates the third clock count "101" into a count value of 416 according to Table 4 which is loaded into counter 62.

LOAD remains at logic zero so that multiplexer 35 reads FEEDBACK and multiplexers 42 read from multiplexers 40 in each cell. At the first CLOCK edge of the third clock count, the logic zero that was in flip-flop 44 of cell 14 is loaded as the FEEDBACK signal into flip-flop 36. With the new polynomial coefficients, bit 0 is logic one so multiplexer 40 reads from the Q-output of flip-flop 36. In cell 1, multiplexer 40 reads from the Q-output of flip-flop 44 of cell 0 because bit 1 of the polynomial coefficient is logic one, and so on. Following the first CLOCK edge of the second clock count, flip-flop 36 and flip-flops 44 of cells 0–14 contain "0101010010100001". Polynomial generator 34 receives another 415 CLOCK edges as counter 62 executes the third clock count. At the end of 416 CLOCK edges, assume that flip-flop 36 and flip-flops 44 in cells 0–14 contain the remainder value "1001001111001010" with flip-flop 36 having the most significant bit and cell 14 having the least significant bit. Again, counter 62 waits for a full 512 counts.

The resulting values in flip-flop 36 and flip-flops 44 of cells 0–14 is the remainder for key validation. The process can be repeated more times until detection of the algorithm details becomes improbable. The remainder is mixed with random data on either or both sides, and stored in register 22 at the seed offset position, e.g. bits 5–20, for transmission back to host 12 for comparison. Host 12 has performed the same calculation of a remainder as described for key 10. If the remainders match then key 10 receives validation. If the remainders do not match, key 10 is not validated and the automobile control system shuts down the engine, locks out all functions, and sounds an anti-theft alarm.

In an alternate embodiment, the length of the polynomial can be varied by masking out certain polynomial coefficients. For example, the first polynomial run could be with a full 16-bit polynomial, while the second polynomial run is conducted with 15 coefficients, and the third polynomial run has only 14 coefficients. Host 12 just follows the same algorithm as key 10.

The direct communication link between key 10 and host 12 exists when the key is in the ignition. Key 10 and host 12 can readily communication by the direct metal-to-metal contact or inductive coupling. A different problem arises when key 10 is attempting remote keyless entry, for example, to lock or unlock the door, or open the trunk, from some distance away. When key 10 is placed in the ignition and the validation process run as described above, a polynomial select code and polynomial seed are placed in register 22. That same polynomial select code and polynomial seed remain in register 22 of key 10 when the key is removed from the ignition. The contents of register 22 are battery backed-up so that they are available for an RKE validation sometime later.

Assume the user leaves the auto with the last used polynomial select code and polynomial seed stored in register 22 of key 10. When the user returns and presses the first button to unlock the doors, key 10 runs the validation sequence with the previously stored polynomial select code and polynomial seed. Key 10 transmits by RF or infrared link the remainder along with the COMMAND CODE "010" to unlock the doors. Host 12 may not receive the transmission because the battery in key 10 is weak or the user is too far away. The user presses the first button a second time and maybe a third time trying to unlock the doors. Each attempt, key 10 runs the validation sequence with the polynomial select code and polynomial seed from the starting point of the last remainder and transmits the remainder to host 12. Key 10 also transmits a count value, see frame format in FIG. 2, that indicates how many times the polynomial has been run, i.e. how many times the button has been pressed. Once the message is received, host 12 runs its own polynomial generator in a like manner the same number of times according to the count value so that its final remainder should match the remainder actually received from key 10. After a certain number of unsuccessful tries at communicating with host 12, say 64 attempts at RKE, key 10 shuts down. The only access option is to physically place the key in the lock. Host 12 can supply power through the inductive coupling or metal-to-metal connection if battery power in the key is low to run the key validation sequence described above.

By now it should be appreciated that an electronic key validation process increases security by encrypting the security codes passed between the key and the host. The key receives a data command field including a hidden polynomial select code and a hidden polynomial seed from the host. A select offset and seed offset are locally stored in the key and identifies the locations of the select code and seed hidden in the data command field. The select code decodes to polynomial coefficients which are used to configure a polynomial generator. The polynomial seed is loaded into the polynomial generator as a starting point of the polynomial. The polynomial generator is clocked a number of cycles to calculate a remainder. The select code is modified by adding a new value to the previous select code to select a new polynomial. The polynomial generator is clocked another number of cycles. The process repeats until the desired level of security is achieved, i.e. the remainder is scrambled enough times to make detection difficult. The host runs a similar encryption algorithm. The remainder is sent to the host as a key validation code where it is compared with the host generated remainder.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A method of validating a key with a host, comprising the steps of:

configuring a polynomial generator with a first polynomial;

clocking said polynomial generator a first number of cycles based on a first clock count from a starting point to calculate a first remainder in said polynomial generator;

configuring said polynomial generator with a second polynomial; and clocking said polynomial generator a second number of cycles based on a second clock count from said first remainder to calculate a second remainder in said polynomial generator.

2. The method of claim 1 further comprising the steps of:

configuring a polynomial generator in the host with said first polynomial;

clocking said polynomial generator in the host a first number of cycles based on a first clock count from a starting point to calculate a first remainder in said polynomial generator in the host;

configuring said polynomial generator in the host with said second polynomial; and clocking said polynomial generator in the host a second number of cycles based on a second clock count from said first remainder to calculate a second remainder in said polynomial generator in the host.

3. The method of claim 1 further comprising the steps of:

receiving a first polynomial select code and a polynomial seed; and selecting said first polynomial based on said first polynomial select code.

4. The method of claim 3 further including the steps of:

adding a first value to said first polynomial select code for providing a second polynomial select code; and selecting said second polynomial based on said second polynomial select code.

5. The method of claim 4 further including the steps of:
waiting for a maximum count before further clocking said polynomial generator in the key;
adding a second value to said second polynomial select code for providing a third polynomial select code; and
waiting for said maximum count before further clocking said polynomial generator in the key.

6. The method of claim 5 further including the steps of:
selecting a third polynomial based on said third polynomial select code;
configuring said polynomial generator in the key with said third polynomial; and
configuring said polynomial generator in the host with said third polynomial.

7. The method of claim 6 further including the steps of:
clocking said polynomial generator in the key a third number of cycles from said second remainder to calculate a third remainder in said polynomial generator in the key, where said third number of cycles is equal to a sum of said first number of cycles and said second number of cycles; and
clocking said polynomial generator in the host said third number of cycles from said second remainder to calculate a third remainder in said polynomial generator in the host.

8. The method of claim 7 further including the steps of:
sending said third remainder to the host as a key validation code; and
comparing said key validation code with said third remainder in said polynomial generator in the host to determine validation of the key.

9. The method of claim 1 further including the step of embedding a first polynomial select code and a polynomial seed in a data field in locations defined by a select offset and a seed offset respectively.

10. An integrated circuit for encrypting a key validation, comprising:
a first register coupled for receiving data and a select offset and a seed offset where said select offset identifies a polynomial select code within said data and said seed offset identifies a polynomial seed within said data;
a select decode logic circuit coupled for receiving said polynomial select code for providing a polynomial;
a polynomial generator coupled for receiving said polynomial from said select decode logic circuit and further coupled for receiving said polynomial seed for defining a starting point of said polynomial, said polynomial generator being clocked a first number of cycles to calculate a remainder in said polynomial generator; and
a modification circuit having a first input coupled for receiving said polynomial select, and an output for providing an updated polynomial select code to said select decode logic circuit.

11. The integrated circuit of claim 10 wherein said polynomial generator comprises:
a plurality of cells serially coupled with each cell receiving one bit of said polynomial and one bit of said polynomial seed; and
a first flip-flop having a data input coupled for receiving a feedback signal from a last one of said plurality of cells, a clock input coupled for receiving a clock signal, and an output coupled to a first one of said plurality of cells.

12. The integrated circuit of claim 11 wherein said last one of said plurality of cells includes:
a logic gate having a first input coupled for receiving said feedback signal, and a second input coupled to an output of an adjacent one of said plurality of cells;
a multiplexer having a first input coupled to an output of said logic gate, a second input coupled to said output of said adjacent one of said plurality of cells, and a control input coupled for receiving said one bit from said polynomial; and
a second flip-flop having a data input coupled to an output of said multiplexer, a clock input coupled for receiving said clock signal, and an output for providing said feedback signal.

13. The integrated circuit of claim 12 wherein said polynomial generator further includes:
a second register storing a count select;
a counter decode logic circuit coupled for receiving said count select and providing a count value; and
a counter coupled for receiving said count value and providing a number of clock signals equal to said count value.

14. A method of encrypting a validation sequence in an integrated circuit between a key and a host, comprising the steps of:
receiving data from a host where said data includes a first polynomial select code and a polynomial seed;
decoding said first polynomial select code into a first polynomial;
configuring a polynomial generator with said first polynomial;
loading said polynomial generator with said polynomial seed as a starting point of said first polynomial;
clocking said polynomial generator a first number of cycles based on a first clock count from said starting point to calculate a first remainder in said polynomial generator;
configuring said polynomial generator with a second polynomial; and
clocking said polynomial generator a second number of cycles based on a second clock count from said first remainder to calculate a second remainder in said polynomial generator.

15. The method of claim 14 further comprising the steps of:
configuring a polynomial generator in the host with said first polynomial;
clocking a polynomial generator in the host a first number of cycles based on a first clock count from a starting point to calculate a first remainder in said polynomial generator in the host;
configuring said polynomial generator in the host with said second polynomial; and
clocking said polynomial generator in the host a second number of cycles based on a second clock count from said first remainder to calculate a second remainder in said polynomial generator in the host.

16. The method of claim 15 further including the steps of:
waiting for a maximum count before further clocking said polynomial generator in the key;
adding a first value to said first polynomial select code for providing a second polynomial select code; and
decoding said second polynomial select code into said second polynomial.

17. The method of claim 16 further including the steps of:
waiting for said maximum count before further clocking said polynomial generator in the key;
adding a second value to said second polynomial select code for providing a third polynomial select code;
decoding said third polynomial select code into a third polynomial; and
configuring said polynomial generator in the key with said third polynomial.

18. The method of claim 17 further including the steps of:
clocking said polynomial generator in the key a third number of cycles from said second remainder to calculate a third remainder in said polynomial generator in the key, where said third number of cycles is equal to a sum of said first number of cycles and said second number of cycles;
configuring said polynomial generator in the host with said third polynomial; and
clocking said polynomial generator in the host a third number of cycles from said second remainder to calculate a third remainder in said polynomial generator in the host, where said third number of cycles is equal to a sum of said first number of cycles and said second number of cycles.

19. The method of claim 18 further including the steps of:
sending said third remainder to the host as a key validation code; and
comparing said key validation code with said third remainder in said polynomial generator in the host to determine validation of the key.

20. The method of claim 14 further including the step of embedding said first polynomial select code and a polynomial seed in a data field in locations defined by a select offset and a seed offset respectively.

* * * * *

UNITED STATES PATENT AND TRADEMARK OFFICE
CERTIFICATE OF CORRECTION

PATENT NO. : 5,631,962
DATED : May 20, 1997
INVENTOR(S) : Thomas J. Balph et al.

It is certified that error appears in the above-indentified patent and that said Letters Patent is hereby corrected as shown below:

In column 12, claim 14, line 27, delete the number "5" therefor.

Signed and Sealed this

Twenty-fifth Day of November, 1997

Attest:

BRUCE LEHMAN

*Attesting Officer*  *Commissioner of Patents and Trademarks*